United States Patent [19]

Page et al.

[11] 4,179,165
[45] * Dec. 18, 1979

[54] MODULATING VALVE ASSEMBLY FOR RAILROAD CAR BRAKE CYLINDERS

[76] Inventors: William R. Page, 400 E. Randolph St., Chicago, Ill. 60601; James G. Rees, 1212 Lake Shore Dr., Chicago, Ill. 60610

[*] Notice: The portion of the term of this patent subsequent to Jun. 6, 1995, has been disclaimed.

[21] Appl. No.: 910,687

[22] Filed: May 30, 1978

Related U.S. Application Data

[63] Continuation-in-part of Ser. No. 813,005, Jul. 5, 1977, Pat. No. 4,093,315.

[51] Int. Cl.² .............................................. B60T 11/12
[52] U.S. Cl. ......................................... 303/59; 303/62
[58] Field of Search .................. 303/1, 22 R, 23 R, 28, 303/57, 59, 60, 62, 66, 86

[56] References Cited

U.S. PATENT DOCUMENTS

| | | | |
|---|---|---|---|
| 1,265,004 | 5/1918 | Turner | 303/62 |
| 2,028,404 | 1/1936 | Matrossoff | 303/59 |
| 2,034,393 | 3/1936 | Hessian | 303/59 |
| 3,671,086 | 6/1972 | Scott | 303/22 R |
| 4,093,315 | 6/1978 | Page et al. | 303/59 |

*Primary Examiner*—Duane A. Reger
*Attorney, Agent, or Firm*—McWilliams, Mann and Zummer

[57] ABSTRACT

A modulating valve for railroad car brake cylinders to adapt them for operation with composition brake shoes, in the form of an assembly comprising a bracket plate arranged for connection in the brake cylinder pipe, at a convenient location between the brake cylinder and the AB control valve, in place of a portion of the brake cylinder pipe removed for that purpose, and a modulating valve mounted on the bracket plate and in communication with the brake cylinder pipe and brake cylinder to limit the fluid pressures supplied to the brake cylinder so that composition brake shoes will deliver the proper brake applying force to the truck wheels without interferring with proper operation of existing brake control equipment.

14 Claims, 5 Drawing Figures

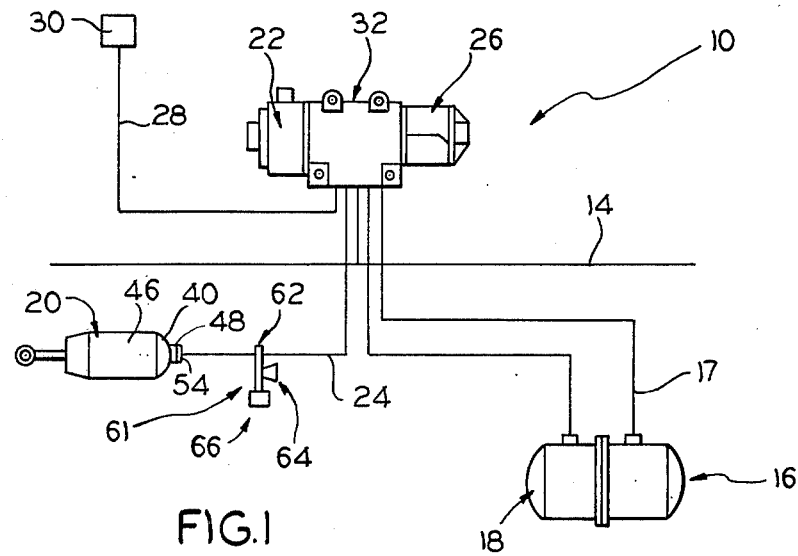
FIG.1
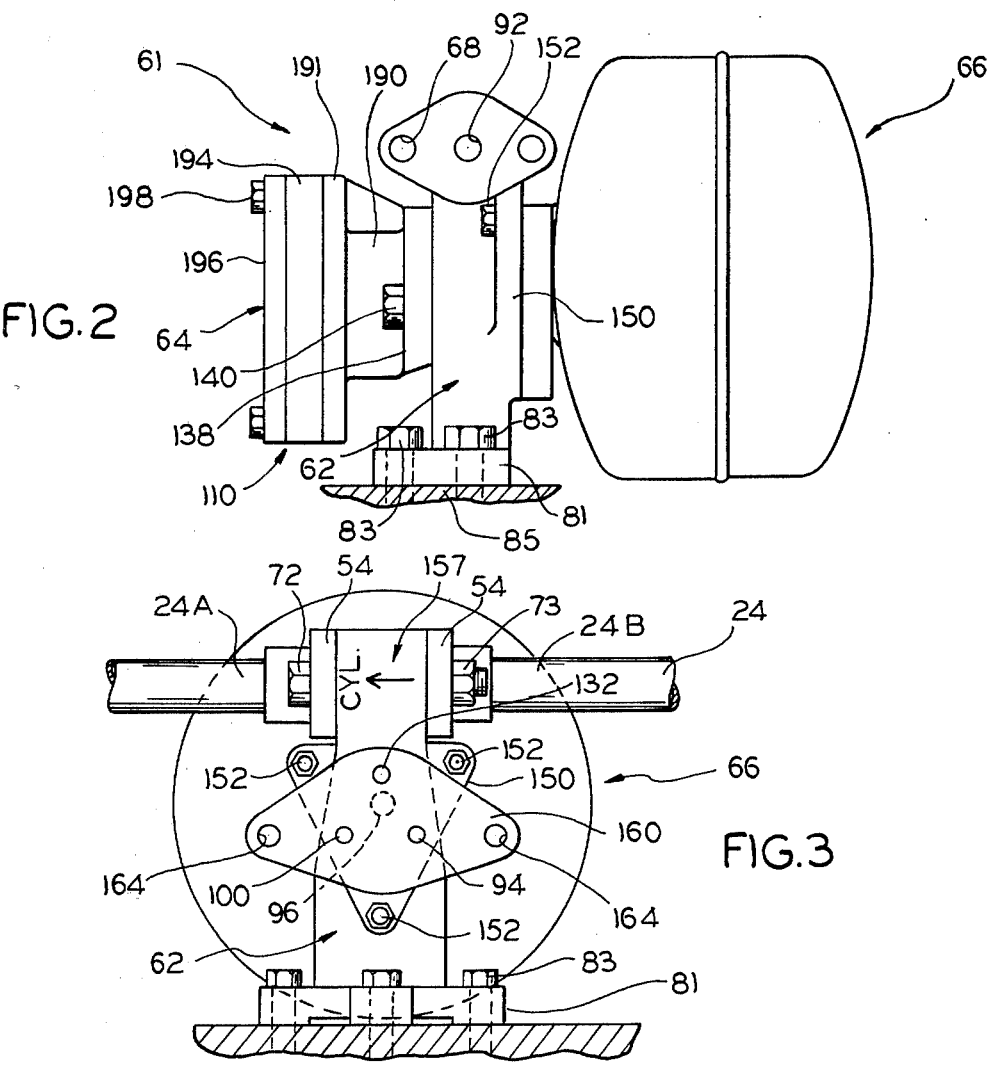
FIG.2
FIG.3

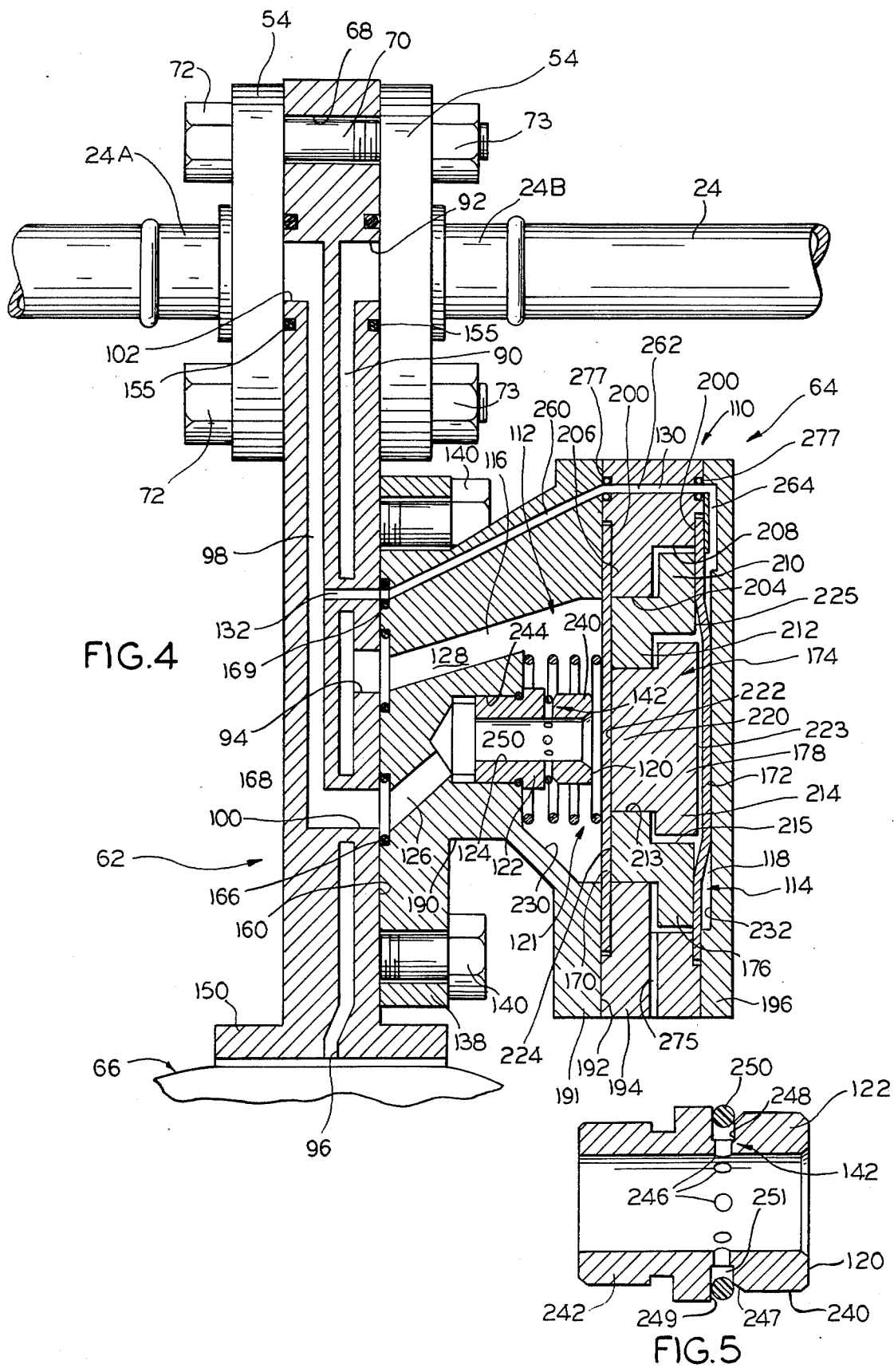

MODULATING VALVE ASSEMBLY FOR RAILROAD CAR BRAKE CYLINDERS

This Application is a continuation-in-part of our Application Ser. No. 813,005, filed July 5, 1977, now U.S. Pat. No. 4,093,315, granted June 6, 1978, the entire disclosure of which is incorporated herein by this reference.

This invention relates to a modulating valve assembly for use with railroad car pneumatic brake equipment, and more particularly, to a modulating valve assembly for connection to the car brake cylinder to adapt the brake cylinder to deliver the amount of brake applying force to the truck wheels that is proper for the modern composition brake shoes.

The now familiar composition type brake shoe has a much higher coefficient of friction than the older type cast iron shoes, and when applied to the car truck wheels requires a significantly less shoe applying pressure than required for cast iron shoes to effect the same degree of braking on the car wheels. However, it is well known in the railroad field that merely reducing brake equipment actuating pressures is no answer to successfully equipping with composition shoes a car with rigging designed for use with cast iron shoes. Furthermore, modification or complete replacement of car rigging designed for use with cast iron shoes to conform to requirements where composition shoes are to be used is too costly to be practical from the standpoint of updating most older freight cars.

A conventional approach to the problem is to convert existing brake cylinders designed for use with cast iron shoes into a smaller effective size. See, for instance, Salton U.S. Pat. No. 3,260,169.

The present invention is concerned with equipping existing brake cylinders of brake rigging designed for using cast iron shoes with a modulating valve that is arranged so that composition shoes if applied to the car in question will act on the truck wheels with a brake force that is a predetermined percentage of the braking force required for cast iron shoes, without having to physically modify the brake cylinder as such.

A principal object of the invention is to provide a modulating valve assembly for connection to brake cylinders of rigging designed for use with cast iron shoes, so that the brake cylinder itself need not be modified, other than by application thereto of the valve assembly, to deliver the braking force appropriate when the car is equipped with composition shoes.

Another important object of the invention is to provide a modulating valve assembly adapted for connection to brake cylinders designed for use with cast iron shoes for converting such cylinders to use with composition shoes, that may be applied as a unit to the brake cylinder pipe between the connection of the brake cylinder pipe to the brake cylinder head and the AB control valve without requiring structural modification of the cylinder or its operating parts, and where there is insufficient room adjacent to the brake cylinder head for application of the bracket plate of our said Application.

Yet another important object of the invention is to provide a modulating valve arrangement for use with brake cylinders designed for use with cast iron shoes that is arranged for readily providing for any given application, any desired ratio of composition shoe braking force to cast iron shoe braking force that may be appropriate for the particular car involved.

Other objects of the invention are to provide a modulating valve arrangement that operates equally well under both low and full pressure conditions, that insures that the composition shoes will bear against the truck wheels with the force required by the AAR at 10 pounds brake fluid pressure, and that is economical of manufacture, easy to assemble and install, and long lived and reliable in operation.

In accordance with the invention, a modulating valve assembly is provided comprising a bracket plate that is arranged to incorporate the assembly in the brake cylinder pipe between the brake cylinder end of the brake cylinder pipe and the AB control valve in situations where there is insufficient room at the head end of the brake cylinder for application thereto of the bracket plate of our said application.

The revised bracket plate mounts the modulating valve device that is formed, in accordance with said Application, to provide communication between the upstream portion of the brake cylinder pipe and the valve device, and between the valve device and the downstream portion of the brake pipe, and thence the brake cylinder, with the modulating valve device being arranged to supply to the brake cylinder the actuating fluid under pressure that will cause the composition shoes to apply to the truck wheels the braking force that is appropriate for composition shoes, as compared to the older cast iron shoes.

The modulating valve device itself comprises a housing defining a cavity having a differential valve member mounted across the cavity to define a first or fluid flow cut off chamber and a second or differential valve closing chamber on either side of the valve member, and for flexing movement axially of the valve member to seat against an annular valve seat positioned in the indicated first chamber of the valve device. The valve device first chamber is in open communication with the upstream portion or segment of the brake cylinder pipe through a first passage formed in the bracket plate, and a second passage formed in the bracket plate communicates the valve device second chamber with the brake cylinder through said valve seat and the downstream segment of the brake cylinder pipe. The differential valve member is mounted to be flexed, under the action of differential pressures acting on same, against the valve seat for sealing off communication of the indicated bracket plate second passage to the indicated valve device first chamber, and against a spring bias tending to hold the valve seat open. The valve device second chamber is in free communication with the bracket plate second passage, and the valve member has exposed in the respective valve chambers on either side of the valve member working areas of which the working area exposed to the valve member second chamber is greater than the working area of same that is exposed to the valve device first chamber by a predetermined ration, whereby when the valve chambers are subject to fluid pressure supplied through the upstream portion of the brake cylinder pipe, the valve member will be, as the fluid pressures build up, subject to a differential pressure force that will bias same towards sealing relation with the valve seat.

The differential valve member itself comprises a pair of spaced apart diaphragms spanning the valve housing cavity and having their ends mounted in sealed relation within the housing to dispose said diaphragms to define the indicated valve member working areas, and a composite piston interposed between the diaphragms that includes an inner part centered with respect to and overlying the valve seat of the valve device first chamber, and an outer part in circumambient relation to the piston inner part. The piston parts are in close fitting lost motion relation, with the piston outer part defining a bore receiving the piston inner part, and with the piston outer part bore being larger than the indicated valve seat. A compression spring encircles the valve seat to bias the valve member away from same and engages the diaphragm that opposes the valve seat and that is adapted to engage the valve seat when the predetermined differential force acts to close the valve member against the valve seat. The valve seat is operably associated with an adjacent check valve that opens when the brakes are released to accommodate fluid pressure discharge from the brake cylinder and out the brake cylinder pipe in the usual manner.

The modulating valve is arranged so that, for minimum service applications, it remains fully open, and brake cylinder pressure is not effected, so that static preloads in the rigging (due to brake beams, brake adjusters, and the like) will be overcome and brake shoe contact with the wheels is effected with the force required by the AAR at ten poiunds brake cylinder pipe pressure. For higher brake cylinder pipe pressure service applications, the modulating valve through the operation of the differential valve member as coordinated with the compression spring associated with same acts to limit the air pressure supplied to the brake cylinder to provide the desired ratio of composition shoe braking force to cast iron shoe braking force.

The differential valve member is arranged to accommodate accurate designing into any particular model of same the point during the brake stroke at which air flow to the brake cylinder is to be stopped at the desired predetermined brake force ratio, while yet insuring that the brake cylinder acts under full brake cylinder pipe pressure for minimum service application whereby the static preloads in the rigging will be overcome. Further, the arrangement is such that the operating stroke of the differential valve member need only be on the order of 0.050 inch, and that destructive crushing of the portion of the valve diaphragm that engages the valve seat for closing off fluid pressure flow to the brake cylinder is avoided.

Other objects, uses, and advantages will be obvious or become apparent from a consideration of the following detailed description and the application drawings in which like reference numerals indicate like parts throughout the several views.

In the drawings:

FIG. 1 is a diagrammatic view in largely block diagram form indicating the principal air operated and operating components of a typical railroad freight vehicle, including a showing of the brake cylinder and brake cylinder pipe as equipped in accordance with the practice of the present invention;

FIG. 2 is an end elevational view of the modulating valve assembly of this invention, including the bracket plate and the modulating valve device and volume chamber secured thereto, but with the brake cylinder pipe omitted;

FIG. 3 is a side elevational view of the bracket plate of FIG. 2 as incorporated in the brake cylinder pipe, but with the modulating valve device itself omitted;

FIG. 4 is a diagrammatic sectional view of the assembly shown in FIGS. 2 and 3, showing the relation between the brake cylinder pipe, the bracket plate, and the modulating valve device of the invention, with parts being partially broken away and the valve assembly volume reservoir largely omitted; and FIG. 5 is an enlarged sectional view better illustrating the check valve employed in the modulating valve of this invention.

However, it is to be distinctly understood that the specific drawing illustrations provided are supplied primarily to comply with the requirements of the Patent Laws, and that the invention is susceptible of other embodiments that will be obvious to those skilled in the art, and which are intended to be covered by the appended claims.

GENERAL DESCRIPTION

Reference numeral 10 of FIG. 1 generally indicates the principal air operated and air operating components of a typical railroad freight car air operated brake apparatus including the usual AB control valve 12 to which is connected the familiar brake pipe 14, the auxiliary reservoir 16, the emergency reservoir 18, and the brake cylinder 20. As usual, the control valve 12 includes service portion 22 adapted to operate both a service and an emergency rate of reduction in pressure of the fluid in the car brake pipe 14 for supplying fluid (air) under pressure from the auxiliary reservoir 16 to brake cylinder pipe 24.

Control valve 12 also includes emergency portion 26 adapted to operate only upon an emergency rate of reduction of pressure of the air in the brake pipe 14 for supplying air under pressure from emergency reservoir 18 to the brake cylinder 20.

Upon recharging of the brake pipe 14 on release of the brakes, control valve 12 operates to open the brake cylinder to atmosphere through pipe 28 and retaining valve device 30. At the same time the recharging of the brake pipe 14 effects the charging of the reservoirs 16 and 18 in the usual and well known manner. The service and emergency portions 22 and 26 of control valve 12 are mounted on the opposite faces of the pipe bracket 32 to which all pipe connections to the brake control valve 12 are made, as is conventional, and as indicated in the showing of FIG. 1. Of course, AB valve 12 may also take the form of the newer ABD valve, as is well known in this field.

As to the brake cylinder 20 itself, it conventionally comprises the usual cylinder head 40 that is flanged for bolted application to the conventional flange of the usual brake cylinder shell 46. The head 40 is shaped to define the usual projecting hub portion 48 defining the familiar brake cylinder inlet port planar land portion against which is secured the usual flange type fitting 54 that couples the brake cylinder pipe 24 to the head 40, which fitting 54 is conveniently secured in place by employing a pair of bolts applied to a pair of bolt holes formed in head 40 for that purpose, all as disclosed in our said Application.

In accordance with the present invention, the brake apparatus 10 is adapted for use in connection with rigging equipped with composition shoes, by applying to the brake cylinder pipe 24 the modulating valve assembly 61 at a convenient location in the brake cylinder pipe 24 (assuming the rigging in question has been designed for use with cast iron brake shoes), where there is insufficient room at the head end of the brake cylinder 20 to employ the bracket arrangement of our said Application.

As indicated in FIGS. 2-4, the assembly 61 comprises bracket plate 62 having secured to same modulating valve device 64 (FIG. 4), and volume reservoir 66.

Bracket plate 62 is formed with a pair of bolt receiving openings 68 (only one is illustrated in diagrammatic FIG. 4) which receive the threaded shanks 70 of bolts 72 that in accordance with the invention are employed to secure a pair of fitting plates 54 on either side of the bracket plate 62 that are of the same type of flange type fitting plate 54 conventionally employed to couple the brake cylinder pipe 24 to cylinder head 40. The brake pipe 24 is suitably interrupted at a convenient location between its connection to valve 12 and the brake cylinder 20, the fitting plates 54 of FIGS. 3 and 4 are applied to the thus formed end portions 24A and 24B of the brake cylinder pipe 24 (for coupling such end portions 24A and 24B to the bracket plate 62), and then the bracket plate 62 is disposed between such fitting plates 54 and the bolts 72 and their cooperating nuts 73 applied thereto to clamp the fitting plates to either side of the bracket plate 62 to couple the indicated brake cylinder pipe ends thereto, for operation of assembly 61 in the manner disclosed in said Application, and as described hereinafter.

Further in accordance with the invention, the bracket plate 62 is equipped with a bracing foot in the form of flange 81 that receives suitable bolts 83 to anchor bracket 62 to a convenient adjacent car structure 85 (flange 81 is omitted from the showing of FIG. 4).

Further in accordance with the invention, the bracket plate 62 is formed to define passage 90 having a port 92 which communicates with the brake cylinder pipe end 24B and a port 94 which communicates with valve device 64. Passage 90 also communicates with the volume reservoir 66 at port 96.

Bracket plate 62 is further formed to define passage 98 that communicates with the valve device 64 at port 100 and communicates with the brake cylinder pipe end 24A at port 102.

The valve device 64 is that shown in FIG. 6 of said application, and comprises a housing 110 formed to define cavity 112 across which is mounted differential valve member 114 that defines the cavity 112 into the respective chambers 116 and 118. The valve member 114 cooperates with an annular valve seat 120 formed on a tubular member 122 to form air flow shut-off valve 121. Member 122 has its bore 124 in communication with passage 126 formed in housing 110 and aligned with the bracket plate port 100. The housing 110 is formed also to define passage 128 that communicates between the bracket plate port 94 and chamber 116. The housing 110 further defines passage 130 that communicates between the chamber 118 and a lateral extension 132 of the passage 98 which is formed in bracket plate 62.

The valve member 114 of valve device 64 is spring biased away from seat 120 by suitable compression spring 136.

Housing 110 is suitably flanged as at 138 for application thereto of suitable bolts 140 for securing the device 64 to bracket plate 62.

Operably associated with the tubular member 122 of valve device 64 is check valve 142 that is operative to accommodate air flow from the brake cylinder through brake cylinder pipe 24 and thence to retainer 30 on release of the brakes, as will be hereinafter described in detail.

The assembly 61, in general terms, functions to make available to the brake cylinder 20 for minimum service operations the brake cylinder pipe pressure at 100 percent to insure that the rigging static preloads are overcome for such minimum service applications. For normal or full service applications, the assembly 61 also functions to limit the air pressure build up in the brake cylinder 20 to a predetermined percentage of that for which the brake cylinder 20 was designed for use in connection with cast iron shoes (for instance a percentage in the range of 50-60 percent), by the differential nature of valve member 114 and its cooperating chambers 116 and 118, whereby the valve member 114 seats against the valve seat 120 to close the normally open valve 121 of the device 64. On release of the brakes, check valve 142 opens to release the air in the brake cylinder 20 through brake cylinder pipe 24 for exhaust through control valve 12 and retainer valve 30.

The modulating valve device 64 involves a number of specific improvements that are described hereinafter.

SPECIFIC DESCRIPTION

In the showing of FIG. 4, the bracket plate 62, the modulating valve 64, and the volume reservoir 66 are illustrated in positioning and shaping somewhat displaced from the positioning of FIGS. 2 and 3 to facilitate illustration and description.

The bracket plate 62 may be formed in any suitable manner to define the passages and porting indicated. It is flanged as at 150 for application thereto of the volume reservoir 66, which may be of any suitable type of chamber defining vessel for the storage of air received from the bracket plate passage 90 through port 96 and suitable porting (not shown) formed in chamber 66. Suitable bolts 152 may be employed to secure the volume chamber 66 to the bracket plate 62. Plate 62 may be suitably grooved at 153 to receive the respective O-ring seals 155 that are disposed about the respective ports 92 and 102, and may be suitable marked as indicated at 157 to indicate to the installer the correct positioning of the assembly 61 with regard to brake service pressure fluid flow through brake cylinder pipe 24.

The bracket plate 62 is formed to define planar land or surface 160 against which housing 110 seats for application thereto of the mounting bolts 140 to bracket plate holes 162 through the housing bolts holes 164. Suitable O-ring seals 166, 168 and 169 are employed between the housing 110 and bracket plate 62 where indicated in FIG. 4 for sealing purposes at the juncture of the passages 126, 128 and 130 with the corresponding ports of the bracket plate 62.

The valve member 114 of valve device 64 is of special significance and construction and comprises an inner diaphragm 170 and an outer diaphragm 172 operably associated with and receiving therebetween the composite piston 174 that structurally comprises an outer annular piston part 176 that receives in a lost motion manner an inner piston part 178. The piston parts 176 and 178 are in substantial coplanar relation between the diaphragms 170 and 172, and are proportioned laterally of the valve member 114 so that they may be engaged by both the diaphragms 170 and 172 when aligned for this (in the plane of member 114). The housing 110 comprises a base or pedestal 190 that is formed with flange 191 defining outwardly facing land 192 on which is seated annular diaphragm mounting member 194 on top of which is applied the housing closure cap 196, these parts being suitably held together, as by employing suitable bolts 198 applied to housing 110.

The diaphragms 170 and 172, which are formed from a suitable elastomeric material such as polyurethane, are in disc form having their rims 200 clamped in seal tight relation against mounting member 194 by the action of bolts 198 fixing cap 196 and member 194 to housing 110.

As indicated in FIG. 4, the diaphragm mounting member or component 194 is formed with a stepped diameter opening 204 defining a flange 206 and a counterbore 208, with the outer piston part 176 being of rounded annular configuration and defining an outwardly directed radial flange 210 that cooperates with the flange 206, and an inwardly directed radial flange 212 that freely receives the inner piston part 174 in the bore 213 and counterbore 215 defined by same. The inner piston part 178 defines outwardly directed radial flange 214 which cooperates with the flange 212 of the outer piston part 176.

The piston parts 176 and 178 are proportioned radially thereof and transversely of the respective valve members 174 so that the outer piston part is freely received within the diaphragm mounting component 194, and the inner piston part 178 is freely received within the outer piston part 176, as indicated in FIG. 4. Further, the flanges 206 and 210, and the flanges 212 and 214, of the diaphragm mounting component 194 and the piston parts respectively, are proportioned transversely of the valve member 114 (that is, in its direction of movement relative to seat 120) so that the outer piston part 176 will have some lost motion movement relative to the diaphragm mounting component 194 in the direction of movement of valve member 114, while the inner piston component 178 will have some lost motion movement with respect to the outer piston component 176 in the same direction.

It will also be observed that the inner piston part 178 defines a stud or hub portion 220 having a generally planar inwardly directed working surface 222 having a diameter that exceeds both that of seat 120 and the tubular element 122 in which it is formed, and an outer working surface 223 having a diameter that exceeds that of surface 222 such that the area of surface 223 will exceed that of surface 222 by a predetermined amount. The outer piston part 176 defines an inwardly directed working surface 224 that is annular in configuration and has an inner diameter that exceeds that of the working surface 222, and an outer diameter that is less than the diameter of bore 204 of the diaphragm mounting component 194. Piston part 176 also defines an outwardly directed annular working surface 225 having inner and outer diameters such that the area of surface 225 exceeds that of surface 224 by a predetermined amount.

In the embodiment of FIG. 4, the spring 136 bears against the outer piston part 176, the spring 136 seating against inner diaphragm 170.

The cavity 112 of housing 110 is formed by the recessing 230 of housing base 190, the recessing 232 of the cap 196, and the bores and counterbores 204 and 208 of the diaphragm mounting member 194.

The housing recessing 230 and 232 is formed so that the area of the diaphragm 172 that is exposed by chamber 118 (which is thus the working area of diaphragm 172) exceeds the corresponding working area of the diaphragm 170 that is exposed by chamber 116, by a predetermined percentage which determines the differential operating force of the valve device 64 that will operate same to close the valve 121 and shut off air entry into the brake cylinder 20, at the pressure within the brake cylinder that will provide the desired percentage of composition shoe braking force on the car trunk wheels, as compared to the needed corresponding braking force for cast iron shoes. Of course, this percentage may be of any desired ratio depending on the application and objectives of the particular installation involved, although levels in the range of from about 50 percent to about 60 percent are frequently used. In one commercial form of the invention the ratios of the exposed areas of the respective diaphragms to their respective chambers in the valve device 64 are such that the valve 121 closes when the pressure in the brake cylinder 20 is approximately 56 percent of the pressure in the brake cylinder pipe 24.

In addition, and in accordance with the invention, the piston parts 176 and 178 are arranged such that for minimum service applications, the valve device 64 operates to insure that the air pressure supplied to the brake cylinder is at one hundred percent of brake cylinder line pressure, up to approximately 12 psi, so as to insure the aforementioned needed brake shoe contact with the car wheels (as per AAR standards) for full service and emergency applications, the valve device, while operating at the one hundred percent level up to about 12 psi brake cylinder pipe pressure, reverts to the proportional pressure relationship required for composition brake shoes. This is achieved by, in addition to providing for the diaphragm working surface ratio described above, having the inner and outer working surface areas of piston part 178 (that is not engaged by spring 136) in the indicated desired ratio (56 percent in the referred to example), and the inner and outer working surface areas of the piston part 176 (that is engaged by spring 136) in a different and less ratio, (for instance, 35 percent), that considered together and coordinated with the spring pressure provided by the spring 136 will hold the piston part 176 against moving toward valve closure position (of valve 121) through the zero to approximately 12 psi brake cylinder pipe pressure range, but which, above the approximate 12 psi level, will move the indicated piston part to its closure position.

Thus, in the preferred embodiment of FIG. 4, the inner piston part 178 has its surfaces 222 and 223 in the examplary 56 percent relation. The outer piston part 176 has its working surfaces proportioned in the indicated 35 percent ration.

At the point in the operation of the brake braking stroke where valve 121 is fully closed, valve member 114 and both its piston parts will have deflected under the differential pressures acting on same to seat the inner diaphragm 170 against the valve seat 120, the differential pressures involved having, in addition to moving to its closed position the piston part 178, overcome the biasing action of spring 136 for full closure movement of the other piston part 176, whereby the pressure acting in brake cylinder 20 will be at the desired level needed for composition shoes for a particular input pressure above 12 psi.

As input pressures to the brake cylinder pipe are increased above the design closure pressure for valve 121, valve 121 opens and recloses to provide the higher pressure output to the brake cylinder but in the design proportion. The tubular member 122 has its end portion 240 formed to define the valve seat 20 and has its other end portion 242 threaded for application to the threaded bore 244 defined by the housing base 190, into which opens the housing passage 126 that communicates with the port 100 of bracket plate 62.

The check valve 142 (see FIG. 5) comprises a plurality of lateral openings or parts 246 formed in the tubular member 122 that open exteriorly of the tubular member 122 in circumferential groove 248 about and within which is seated O-ring seal 250. The groove 248 is of inwardly converging shape, including side walls 247 and 249 (at least one of which is frusto conical in shape), and seal 250 is proportioned to seat entirely against the walls 247 and 249 and be spaced from ports 246 when in its closed position, to define an annular air flow distributing chamber 251 underlying seal 250 into which all of the ports 246 open. Thus, when the O-ring seal 250 is in its retracted or closed position shown in FIGS. 4 and 5, the openings 246 are sealed check valve fashion, against air flow through the openings 246 in bypassing relation to the valve seat 120. However, when the air pressure within the tubular member 122 (and thus that within the brake cylinder and the brake cylinder pipe portion ending at 24A) exceeds that within the chamber 116 (and thus that within the brake cylinder pipe 24 portion ending at 24B) a sufficient amount, the O-ring seal 250 under the pressure uniformly building up on same in the chamber 251, dialates outwardly radially thereof to open the check valve 142 for fluid flow outwardly of the brake cylinder 20 through valve device 64 (by passing valve 121) and into the brake cylinder pipe 24 through passage 90.

As indicated in FIG. 4, the valve housing base 190, diaphragm mounting member 194, and cap 196, are formed with connecting passages 260, 262, and 264 that form housing passage 130 communicating the valve device outer chamber 118 with the bracket plate passage 98 through its extension 132.

The space within valve member 174 is vented to atmosphere through passage 275 formed in housing member 194 (see FIG. 4). Seals similar to seals 166 and 168 are preferably employed where indicated in device 64 at 277.

OPERATION

The brake equipment 10 is charged in the usual manner, fluid (air) under pressure being supplied to the brake pipe 14 by the usual locomotive brake valve to operate the control valve 12 in the usual manner to effect charging of the reservoirs 16 and 18. As usual, when the brakes are in released relation, the brake cylinder pipe and the brake cylinder are closed off from the fluid pressure in brake pipe 14 by the operation of control valve 12.

When it is desired to effect a service brake application, the brake valve in the train locomotive is actuated to reduce the fluid pressure in brake pipe 14 an amount corresponding to the degree of brake application desired. This reduction of pressure in the brake pipe 14 causes the service portion 22 of control valve 12 to connect the auxiliary reservoir 16 through pipe 17 and pipe 24 to valve assembly 61 and thence to brake cylinder 20. The air flow from brake cylinder pipe section represented by end portion 24A is into assembly 60 through port 92, passage 90, and port 94 into passage 128 of valve device 64 and its chamber 116 whereby the air pressure in the chamber 116 bears against the exposed area of the diaphragm 170.

As long as valve 121 remains open, the air continues to flow through the valve seat 120, the tubular member 122, the housing passage 126, the port 100, passage 98, and port 102 into the brake cylinder pipe section represented by end portion 24A and thence into the brake cylinder 20.

Within the valve device 64, the chamber 118 receives air under pressure from the bracket plate passage 98, its extension 132, and housing passage 130. As the braking stroke is initiated and proceeds to minimum service level application, the air pressure in chamber 116 plus the biasing action of spring 136 holds the valve 121 open for transmittal of the air pressure fluid through assembly 61 at the desired one hundred percent ratio relative to the pressure in the cylinder brake pipe, so that the braking force at this stage of the braking stroke is the same as for cast iron shoes, thereby insuring the desired application of the brake shoes to the car wheel (against the resistance of static preloads in the rigging) as required by AAR regulations.

However, when the brake pressure fluid pressure in brake cylinder pipe upstream of assembly 61 reaches the desired predetermined level, such as the indicated 12 psi level, the differential nature of the valve device 64 becomes effective to move the valve member 174 to the left of FIG. 4, with the objective of bringing the braking force limiting action of device 64 into full effect as soon as possible in the subsequent braking stroke.

As indicated, the working area of the diaphragm 172 exposed to chamber 118 exceeds the working area of the diaphragm 170 that is exposed to the chamber 116 by the indicated predetermined ratio, and as the air pressure builds up in brake cylinder 20 to the desired percentage of the air pressure in pipe 24 upstream of assembly 61 (this percentage will give the composition brake shoes with which the apparatus 10 is equipped the desired percentage of braking force that cast iron shoes would have), the force acting on the diaphragm 172 overcomes the action of the opposing fluid pressure generated force acting on the diaphragm 170 as well as that of spring 136 to seat the valve member 174 against the seat 120, thus closing off further air flow to the brake cylinder 20.

Also involved is the particular relationships of the areas of the opposed working surfaces 222, 223 and 224, 225 of the valve member outer and inner piston parts 176 and 178. As indicated, the piston part 17 (that is not opposed by the respective spring 136) has its inner and outer working surfaces in the same ratio or proportion that the working areas of diaphragm have to each other, while the other piston part 176 has its inner and outer working surfaces in a lesser proportion, which in combination with the biasing action of the springs 136, is effective to provide one hundred percent braking force up to the desired pressure level above 10 psi, for instance, about 12 psi, in the brake cylinder pipe, after which (assuming the braking action continues for full normal or emergency service) the valve member 174 is moved under the differential forces acting on it to give the braking force the desired limitation. Once valve 121 has closed, further increases in braking input pressure to assembly 61 will open valve 121 and effect closing of same to keep the working pressures in the brake cylinder 20 in the desired ratio.

During this operation of the valve device 64, the check valve 142 remains closed as the pressure in chamber 116 exceeds that within tubular member 122.

On release of the brakes, normal operating pressure in the brake pipe 14 is restored by operation of the usual brake valve in the locomotive, and this causes control valve 12 to close off communication between the reservoir 16 and brake cylinder pipe 24, and open brake cylinder pipe 24 to communication to exhaust through pipe 28 and retainer valve 30. The pressure in brake cylinder pipe section represented by end portion 24B thus drops, and when the pressure in chamber 116 becomes less than the air pressure within the closed off valve 121 (and thus the brake cylinder 20), the check valve 142 opens to discharge the air trapped within the brake cylinder, through its openings 246, into chamber 116, by the O-ring 250 dialating under the air pressure differential involved. As the air pressure reduces in the bracket plate passage 98, it also reduces in the chamber 118 to the point where spring 136 returns the parts of the valve member 174 to the position of FIG. 4, to automatically set valve 121 for the next application of the car brakes.

In this connection, the differential air pressures acting on O-ring seal 250 are uniform thereabout as the brake cylinder pressure acts on seal 250 three hundred sixty degrees about check valve annular chamber 251.

The modulating valve device 64 has a number of significant aspects.

For instance, the arrangement of the valve 64 is such that when a minimum service application is made, no brake cylinder pressure reduction is effected by the differential nature of the valve member 174, whereby brake shoe contact with the wheels is effected with the force required by the AAR at a minimum brake application (approximately ten psi brake cylinder pressure).

This result is achieved both by the biasing action of the spring 136, and the special nature of the composite piston 174. In the device 64, the spring 136 opposes piston outer part 176, and thus in device 64 the working surfaces 222 and 223 of the piston inner part have the same ratio as the ratio of the working areas of diaphragms 170 and 172, while the working surfaces 224 and 225 of outer piston part 176 have the indicated lower ratio (the higher area involved in the indicated ratios is on the outer or right side of the respective device 64, as viewed in FIG. 4). While the specific ratios employed will depend on the specifics of each particular application, the special cooperation provided by the valve member 114 and spring 136 is concerned with providing one hundred percent braking force for minimum service pressure, with the valve device 64 being operative to shift over to its full braking force limiting characteristic as the fluid braking pressure in the brake cylinder pipe 24 moves to and beyond 18 psi for full service conditions.

Thus, for minimum service braking, valve device 64 ordinarily will function only at the one hundred percent braking force level, assuming the brake cylinder pipe pressure does not exceed the indicated approximate 12 psi level, while for greater service and emergency brake applications valve device 64 will function at both the one hundred percent and the desired ratio design levels, with the device 64 being arranged to shift operation between such levels as the braking fluid pressure of pipe 24 moves through the 12 to 18 psi range. The device 64 is preferred as in operation its transition from the one hundred percent operating level to the design operating level will change in a relatively small range of input pressure increases over the indicated 12 psi level.

Another important feature of the invention is that the valve 121 will not fully close until both its piston parts have deflected under the differential forces acting on the member 114 to its full position to the left of FIG. 4. This is because when the piston outer part 176 moves to the full amount of its movement to the left of FIG. 4, its flange 210 seats on flange 206 of the diaphragm mounting member 194. As the piston inner part 178 has lost motion movement with respect to the piston outer part 176, and the spring 136 in seating on the diaphragm 170 bears against one of the piston parts, movement of the outer piston part 176 under the differential forces acting on it, to the left of FIG. 4 does not necessarily involve the same amount of movement of the inner piston part 178. The respective piston parts 176 and 178 have their own areas of contact with the diaphragm 172 that is to actuate same to move same to the left of FIG. 4 under the differential forces developed on valve member 114. The thickness proportioning of the outer piston part flange 210 and the diaphragm mounting member flange 212 are such that when flange 210 seats against flange 206, the biasing action of spring 136 is sufficient to hold the diaphragm 170 and thus the inner piston part 178 spaced from seat 120 until the desired pressure level within the brake cylinder has been achieved.

Similarly, the flange 212 of the piston outer part and the flange 214 of the piston inner part are proportioned such that under pressure conditions operating within the valve device 64, should the flange 214 seat on the flange 212 prior to flange 210 seating on flange 206, the outer piston part 176 will tend to hold the inner piston part 178 from closing diaphragm 170 against seat 120.

However, when the flange 210 of the outer piston part 176 seats against flange 206 of the diaphragm mounting member 194, and flange 214 of the inner piston part 178 seats against the flange 212 of the outer piston part 176, the diaphragm 170 will be seated on seat 120 to close valve 121.

It is a feature of the invention that the output pressure from assembly 61 will be determined by the operating characteristics of the piston part 176 or 178 that moves last to its valve closing position. As long as one of these piston parts has not moved toward its valve closing position, assembly 61 will operate at the one hundred percent level and pressure input will be equal to pressure output.

It will be noted also that the diaphragms 170 and 172 are each single part or piece diaphragms of the nonrolling type. Since rolling diaphragm type flexture is not involved in the valve device 64, reinforcing of the diaphragms is not required. The valve member 114 is designed for short stroke operation, a closure stroke of about 0.050 inch being involved in a commercial embodiment of the invention.

Furthermore, as it is the inner piston part 176 with the lesser effective area acted on by diaphragm 172 that presses the diaphragm 170 against seat 120, and the pressure differentials acting on the valve member 114 is closely controlled by accurate proportioning of the exposed areas of the diaphragms, damaging type crushing of the diaphragm 170 against the valve seat 120 is avoided.

The O-ring 250 is a commercially available product made from flurosilicone, and in use is approximately as flexible at a minus 60 degrees F. as a standard AB grade buna O-ring is at room temperatures.

It will be noted that the valve device 64 involves no sliding seals (such as piston rings, cups or seal rings) and thus this valve device does not require lubrication either initially or during its operation.

The volume reservoir 66 receives its air charge from brake cylinder pipe 24 directly through passage 90 and thus is upstream of the air flow from the brake cylinder as well as the outer chamber 118 of the differential valve device 64. The volume reservoir 66 will thus be at the pressure of the chamber 116. Its purpose is to insure harmonious operation of the car equipped with the assembly 61 with other cars in the train that have standard AAR brake equipment. The size of the reservoir is to be proportioned so that full service and emergency equalization pressures meet AAR standards. Volume reservoir 66 thus accepts the air from the brake cylinder pipe that is not needed by the brake cylinder, due to the reduced pressures of operation involved (beyond minimum service applications), and makes this air available as the pressure fluid back-up that insures full control valve compliance with AAR standards.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In railroad car air brake equipment including a brake cylinder pipe connected to the brake cylinder head for communicating fluid under pressure to the brake cylinder from the outlet of the brake cylinder pipe to the inlet of the brake cylinder head, a modulating valve assembly therefor for supplying the braking pressure fluid to the brake cylinder at a pressure that is a predetermined percentage of the pressure fluid in the brake cylinder pipe for brake service strokes above minimum service applications, said assembly comprising:

a bracket plate connected in the brake cylinder pipe to define the brake cylinder pipe into upstream and downstream sections on either side of same with regard to the direction of fluid flow through the brake cylinder pipe on brake service strokes of the equipment, said bracket plate being formed to define a first passage communicating with the brake cylinder pipe upstream section and a second passage communicating with the brake cylinder pipe downstream section, a modulating valve device carried by said bracket plate, said valve device comprising:

a housing defining a cavity, a differential valve member mounted across said cavity to define first and second chambers on either side of said valve member and for flexing movement laterally of said valve member, said bracket plate first passage being in free communication with said first chamber, an annular valve seat positioned in said first chamber adjacent said valve member, with said bracket plate second passage being in communication with said first chamber through said valve seat, and said valve member being mounted to be flexed against said seat for sealing off communication, said second chamber being in free communication with said bracket plate second passage, said valve member having exposed in said chambers on either side of same working areas of which the working area exposed to said second chamber is greater than the working area of same that is exposed to said first chamber by a predetermined ratio, whereby when said chambers are subject to fluid pressure in said passages, said valve member will be subject to a differential pressure force biasing same toward said seat, means for spring biasing said valve member away from said seat that is overcome when said differential force reaches a predetermined amount, and check valve means in shunting relation to said seat for releasing fluid under pressure in said brake cylinder and second passage to said first passage when said brake cylinder pipe is free of the fluid under pressure.

2. The valve assembly set forth in claim 1 wherein:

said bracket plate is connected into the brake cylinder pipe between a pair of flange type fittings through which the respective brake cylinder pipe sections respectively communicate, and means for fixing said fittings against said bracket plate, said bracket plate including a bracing foot for fixing said bracket plate to a support that is stationary relative to same to brace said bracket plate.

3. The valve assembly set forth in claim 1 including:

a volume reservoir carried by said bracket plate, same volume reservoir being in communication only with said first passage for accepting from said brake cylinder pipe upstream section on brake service strokes of the equipment the pressure fluid not needed by the brake cylinder for brake service strokes above minimum service applications.

4. For use with railroad car air brake equipment including a brake cylinder pipe connected to the brake cylinder head for communicating fluid under pressure to the brake cylinder from the brake cylinder pipe to the inlet of the brake cylinder head, a modulating valve for supplying the braking pressure fluid to the brake cylinder from the brake cylinder pipe at a pressure that is a predetermined percentage of the pressure fluid in the brake cylinder pipe for brake service strokes above minimum service applications, said modulating valve comprising:

a housing defining a cavity, a differential valve member mounted across said cavity to define first and second chambers on either side of said valve member and for flexing movement laterally of said valve member, first means for connecting the brake cylinder pipe in free communication with said first chamber, an annular valve seat positioned in said first chamber adjacent said valve member, second means for connecting the brake cylinder inlet in communication with said first chamber through said valve seat, said valve member being mounted to be flexed against said seat for sealing off communication of said second connecting means to said first chamber, said second chamber being in free communication with said second connecting means, said valve member having exposed in said chambers on either side of same working areas of which the working area exposed to said second chamber is greater than the working area of same that is exposed to said first chamber by a predetermined ratio, whereby when said chambers are subject to fluid pressure in said passages, said valve member will be subject to a differential pressure force biasing same toward said seat, and means for controlling the movement of said valve member toward and against said valve seat for supplying the braking pressure fluid to said brake cylinder through said valve at one hundred percent brake cylinder pipe pressure level for minimum service brake applications and at a predetermined percent of brake cylinder pipe pressure levels for braking strokes beyond minimum service applications, said controlling means comprising:

means for spring biasing said valve member away from said seat, and lost motion means within said valve member and subject to said differential pressure force and said spring biasing means operative to regulate the seating of said valve member against said seat to provide said pressure levels of said braking fluid to said braking cylinder, and check valve means in shunting relation to said seat for releasing fluid under pressure in the brake cylinder and said second connecting means to said first connecting means when the brakes are released.

5. The modulating valve set forth in claim 4 wherein said differential valve member comprises:

a pair of spaced apart diaphragms spanning said cavity and having their rims mounted in sealed relation within said housing to dispose said diaphragms, to define said valve member working areas, and a composite piston interposed between said diaphragms including an inner part centered with respect to and overlying said seat, and an outer part in circumambient relation to said inner part, said piston parts at their respective opposed ends being in close fitting relation to said diaphragms and defining working surfaces for engagement with same for movement of said piston parts thereby laterally of said valve member, said piston outer part having a bore receiving said piston inner part, with said piston outer part bore being larger than said seat whereby of said piston parts, on movement of same in the direction of said seat, said piston inner part seats said valve member against said seat, said spring biasing means acting on said valve member about said seat and coaxially of said piston parts.

6. The modulating valve set forth in claim 5 wherein:

said spring biasing means acts against one of said piston parts, with the working surfaces of the other piston part having an area ratio that is the same as said predetermined ratio and with the larger of same directed toward said second chamber, and with the working surfaces of said one of said piston parts having an area ratio that is less than said predetermined ratio and with the larger of said directed toward said second chamber.

7. The modulating valve set forth in claim 6 wherein:

said predetermined ratio is in the range of from about fifty to about sixty percent, and said less ratio is on the order of thirty-five percent.

8. The modulating valve set forth in claim 6 wherein:

said one piston part is the outer piston part.

9. The combination set forth in claim 6 wherein:

said piston parts are movable relative to each other laterally of said diaphragms, said housing defining a stop limiting movement of said piston outer part in the direction of said seat short of that which by itself would bring said valve member into seating relation with said seat, said piston inner part being mounted within said piston outer part for lost motion movement laterally of said valve member such that when said piston outer part is seated against said housing stop, said piston inner part under the action of said differential force may seat said valve member against said seat.

10. The combination set forth in claim 9 wherein:

said spring biasing means comprises a compression spring received about said seat in circumambient relation thereto, with said seat being interposed between said housing and the valve member diaphragm facing said seat, said differential force seating said diaphragm against said seat for sealing off said second connecting means from said first chamber.

11. In railroad car air brake equipment including a brake cylinder designed for use with cast iron shoes, and a brake cylinder pipe connected to the brake cylinder for communicating fluid under pressure from the brake cylinder pipe to the brake cylinder, the method of supplying the braking pressure fluid to the brake cylinder from the brake cylinder pipe at a pressure that converts the brake cylinder for use with composition shoes, said method comprising:

feeding the pressure fluid at one hundred percent of the brake cylinder pipe pressure for minimum service brake applications to the brake cylinder up to at least ten psi for overcoming rigging static preloads for effecting brake shoe braking contact with the car wheels with predetermined minimum force, and for full service and emergency brake applications feeding the pressure fluid at one hundred percent of the brake cylinder pipe pressure to the brake cylinder up to at least ten psi for overcoming said rigging static preloads for effecting said brake shoe braking contact with said predetermined minimum force, and when the brake cylinder pipe pressure reaches a predetermined level above about ten psi, feeding the pressure fluid to the brake cylinder at a lower predetermined pressure level to provide a composition shoe braking force that is a predetermined percentage of the braking force required for cast iron shoes.

12. The method set forth in claim 10 wherein:

said predetermined brake cylinder pipe pressure level lies in the range of from about twelve psi to about eighteen psi.

13. The method set forth in claim 11 wherein:

said predetermined percentage of braking force lies in the range of from about fifty percent to about sixty percent.

14. The method set forth in claim 10 wherein:

for said full service and emergency brake applications, the pressure fluid representing the excess of that above said predetermined lower level in the brake cylinder pipe is stored and made available for fluid pressure back up purposes.

* * * * *